(No Model.)
F. W. NICHOLS.
MEANS FOR PREVENTING THE SLIPPING OF BELTS.
No. 410,805. Patented Sept. 10, 1889.
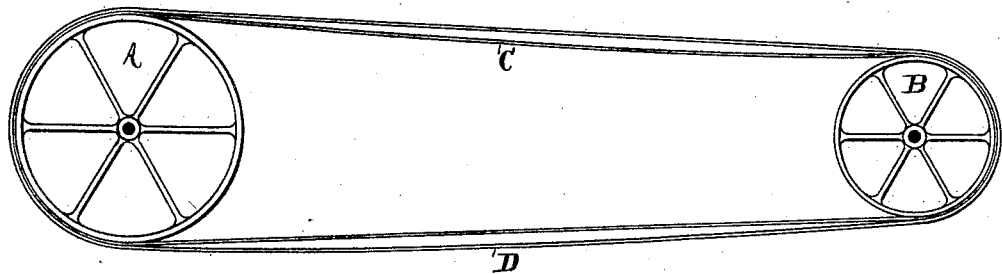
WITNESSES
INVENTOR
Frederick W. Nichols
By Wells W. Leggett &co
Attorneys.

UNITED STATES PATENT OFFICE.

FREDERICK W. NICHOLS, OF ADRIAN, MICHIGAN, ASSIGNOR OF ONE-HALF TO JONATHAN E. INGERSOLL, OF SAME PLACE.

MEANS FOR PREVENTING THE SLIPPING OF BELTS.

SPECIFICATION forming part of Letters Patent No. 410,805, dated September 10, 1889.

Application filed February 27, 1889. Serial No. 301,363. (No model.)

*To all whom it may concern:*

Be it known that I, FREDERICK W. NICHOLS, a citizen of the United States, residing at Adrian, county of Lenawee, State of Michigan, have invented a certain new and useful Improvement in Means for Preventing the Slipping of Belts; and I declare the following to be a full, clear, and exact description of the same, such as will enable others skilled in the art to which it pertains to make and use the same, reference being had to the accompanying drawing, which forms a part of this specification.

My invention has for its object the provision of means for preventing the slipping of belts on pulleys, and consequently the preventing of the running off of belts, since the latter is caused by the former.

The figure in the drawing sufficiently illustrates my invention.

A represents the driven pulley, and B the driver. C is a belt running on these pulleys, and D is another belt placed on top of or over the first and running therewith, thus forming a double belt. These belts may be any desired width or any desired thickness; but I have found from experience that where two belts are thus used they perform better service and last much longer than a single belt of twice their aggregate thickness.

In operating these belts I find that the inner belt will sag as the belts pass above the pulleys, and the outer belt will sag somewhat as the belts pass below the pulleys. By thus running two belts one on top of the other slipping is almost entirely obviated, the running off of the belt is prevented, and the belt made to last longer.

What I claim is—

A means for preventing the slipping of belts, consisting of two belts placed one above the other on the pulleys, so as to form a double belt, both belts mounted loosely on the pulleys, so that the inner belt will sag as the belts pass over the pulleys and the outer belt will sag as the belts pass under the pulleys, substantially as described.

In testimony whereof I sign this specification in the presence of two witnesses.

FREDERICK W. NICHOLS.

Witnesses:
A. L. BLISS,
J. E. INGERSOLL.